United States Patent
Ito et al.

(10) Patent No.: US 8,207,675 B2
(45) Date of Patent: Jun. 26, 2012

(54) VEHICLE LAMP

(75) Inventors: Masayasu Ito, Shizuoka (JP); Fuminori Shiotsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 617 days.

(21) Appl. No.: 12/329,825

(22) Filed: Dec. 8, 2008

(65) Prior Publication Data

US 2009/0154188 A1 Jun. 18, 2009

(30) Foreign Application Priority Data

Dec. 12, 2007 (JP) ................................. 2007-320788

(51) Int. Cl.
*B60Q 1/14* (2006.01)
(52) U.S. Cl. ........................................................... 315/77
(58) Field of Classification Search .................... 315/77, 315/82, 209 R, 224, 225, 226, 291, 294, 297, 315/307, 309
See application file for complete search history.

(56) References Cited

U.S. PATENT DOCUMENTS

| | | | |
|---|---|---|---|
| 2002/0047595 A1* | 4/2002 | Bruwer | 315/200 A |
| 2003/0057888 A1* | 3/2003 | Archenhold et al. | 315/291 |
| 2003/0227257 A1* | 12/2003 | Serizawa et al. | 315/77 |
| 2006/0202634 A1* | 9/2006 | Warner et al. | 315/209 R |
| 2009/0129111 A1* | 5/2009 | Ito et al. | 362/547 |

FOREIGN PATENT DOCUMENTS

JP 2001-216803 8/2001

* cited by examiner

*Primary Examiner* — Douglas W Owens
*Assistant Examiner* — Jonathan Cooper
(74) *Attorney, Agent, or Firm* — Fish & Richardson P.C.

(57) ABSTRACT

A vehicle lamp includes: N semiconductor light sources, wherein N is an integer of 1 or more; M fans configured to cool the N semiconductor light sources, wherein M is an integer of 1 or more; N current supply units configured to supply first current to the N semiconductor light sources, respectively; and a control unit configured to receive electric power supplied from an electric power source and supply second current to the N current supply units. The control unit includes: N switch elements that correspond to the N semiconductor light sources; M switch elements that correspond to the M fans; and a control circuit configured to control fan drive current supplied to the fans through the switch elements and the second current. The fans are coupled to the control unit.

6 Claims, 4 Drawing Sheets

VEHICLE LAMP

This application claims priority from Japanese Patent Application No. 2007-320788, filed on Dec. 12, 2007, the entire contents of which are hereby incorporated by reference.

BACKGROUND

1. Technical Field

The present disclosure relates to a vehicle lamp. More particularly, the present disclosure relates to a vehicle lamp including a control unit that controls the lighting-up of a semiconductor light source including semiconductor light emitting elements and the drive of a cooling fan for suppressing the heat generation of the semiconductor light source.

2. Related Art

An illuminating device is known that includes light emitting diodes (LEDs), used as a semiconductor light source, and a cooling fan. The cooling fan is configured to prevent a high temperature condition of the LEDs caused by heat generated from the LEDs. The illuminating device is provided with a cooling fan drive circuit that controls the rotational drive of the cooling fan, and an LED drive circuit the controls the drive of the LEDs.

In this case, the cooling fan is provided on the back side of multiple LEDs and includes a rotatable propeller. Wind generated by the rotational drive of the propeller of the cooling fan is directed toward the LEDs, so that high temperature condition of the LEDs is prevented (see, e.g., JP-A-2001-216803).

In the related art, the fan drive circuit and the LED drive circuit are separately provided. For this reason, if the LEDs are cooled by the cooling fan, the cooling fan continues to be driven not only when the LEDs are turned ON, but also when the LEDs are turned OFF.

However, when the LEDs are turned OFF, the LEDs do not generate heat, and the cooling fan does not need to be driven. Accordingly, in the related art configuration, a problem arises because electric power is consumed unnecessarily. That is, in terms of electric power savings, it is advantageous that the cooling fan be driven only when the LEDs are turned ON, and the cooling fan be not driven when the LEDs are turned OFF. In the related art, the cooling fan is driven even when the LEDs are turned OFF. For this reason, it is not possible to achieve electric power savings and, thus, the life of the cooling fan is shortened.

Further, if current supply wiring to the cooling fan is opened, current is supplied only to the LEDs. Therefore, the LEDs continue to generate heat. In this case, the supply of current to the LEDs needs to be stopped in order to improve the durability of the LEDs. However, even though the cooling fan is not driven, the LEDs continue to generate heat in the related art configuration. For this reason, the life of the LED is shortened.

To solve the above-mentioned problem, components for monitoring the drive state of the cooling fan and the turning-ON state of the LEDs and components for controlling the cooling fan and the LEDs in accordance with the monitoring results are separately required. However, in such a case, as the number of parts is increased, it is difficult to reduce the manufacturing cost of the vehicle lamp.

SUMMARY

Exemplary embodiments of the present invention address the foregoing issues and other issues not described above. However, the present invention is not required to overcome the problems described above and, thus, some implementations of the present invention may not overcome the specific problems described above.

According to an aspect of the present invention, a low-cost vehicle lamp can detect an abnormality of a semiconductor light source and an abnormality of a cooling fan, and controls the supply of current to the semiconductor light source and the cooling fan depending on the abnormal states detected.

In some implementaions, the vehicle lamp includes: N semiconductor light sources, wherein N is an integer equal to 1 or more; M fans configured to cool the N semiconductor light sources, wherein M is an integer equal to 1 or more; N current supply units configured to supply first current to the N semiconductor light sources, respectively; and a control unit configured to receive electric power supplied from an electric power source and supply second current to the N current supply units. The control unit includes: N switch elements that correspond to the N semiconductor light sources; M switch elements that correspond to the M fans; and a control circuit configured to control fan drive current supplied to the fans through the switch elements and the second current. The fans are coupled to the control unit.

According to some implementations of the present invention, the control unit further includes: N+M current detection circuits that correspond to the N switch elements and the M switch elements to detect the fan drive current and the second current. If the control unit determines that values of the fan drive current detected by the current detection circuits are equal to or smaller than a threshold value, the control unit controls the amount of the supplied second current such that the amount of the supplied second current is decreased and generates abnormal signals of the fans.

According to some implementations of the present invention, the control unit further includes: N+M current detection circuits that correspond to the N switch elements and the M switch elements to detect the fan drive current and the second current and. If the control unit determines that values of the second current detected by the current detection circuits are equal to or smaller than a threshold value, the control unit controls the amount of the supplied fan drive current such that the amount of the supplied fan drive current is decreased and generates abnormal signals of the semiconductor light sources.

In some implementations of the present invention, the control unit controls the magnitude of the fan drive current in accordance with supply time of the second current.

Other aspects, features and advantages of the invention will be apparent from the following description, the drawings and the claims.

DETAILED DESCRIPTION OF EXEMPLARY EMBODIMENTS OF THE INVENTION

Figure 1:
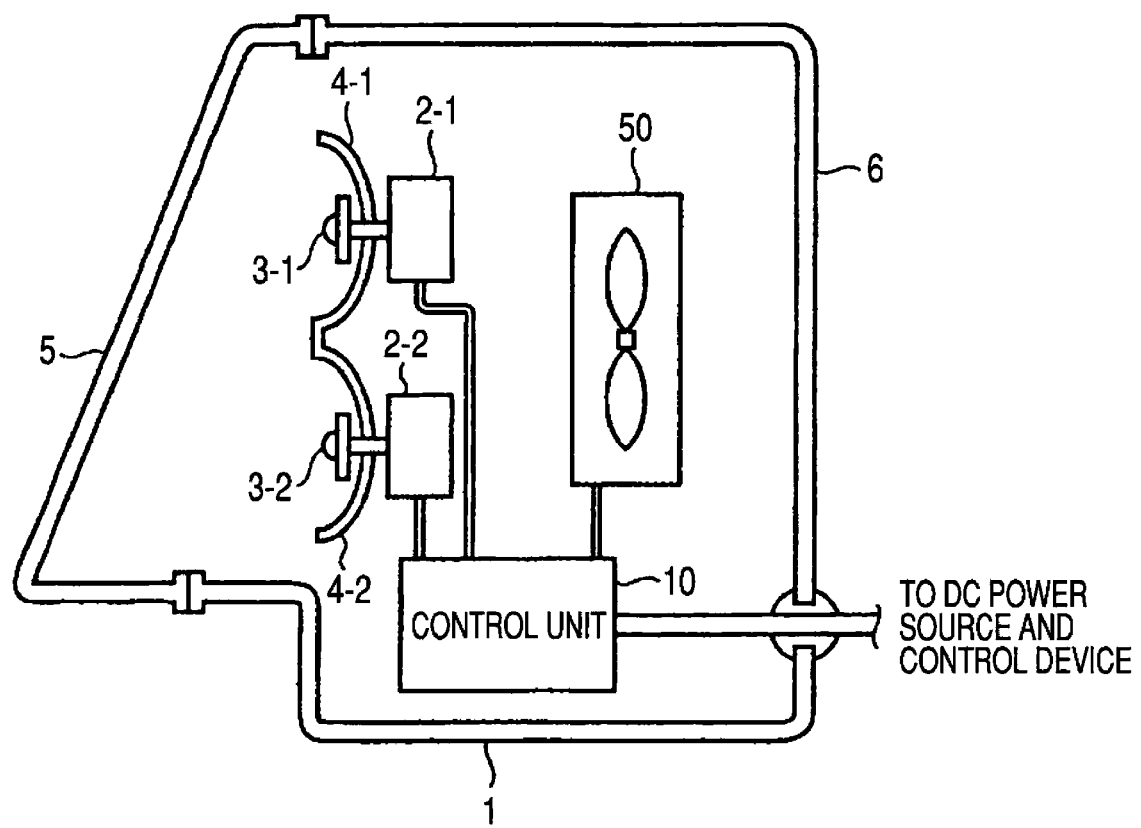
FIG. 1 is a schematic view showing an example configuration of a vehicle lamp according to the present invention.

Exemplary embodiments of the present invention will be now described with reference to the drawings. FIG. 1 is a schematic view showing an example configuration of a vehicle lamp according to the present invention, and shows the basic configuration common to vehicle lamps according to the first to fourth embodiments described below.

As shown in FIG. 1, a vehicle lamp 1 includes LEDs 3-1 and 3-2 that serve as a semiconductor light source, supply units 2-1 and 2-2 that drive and control the loads by supplying current, a control unit 10 that controls LED drive current supplied to the LEDs 3-1 and 3-2, and a cooling fan 50.

The LEDs 3-1 and 3-2 are provided on the inner side of reflectors 4-1 and 4-2, respectively. The LEDs 3-1 and 3-2 are connected to the supply units 2-1 and 2-2 and are driven by constant current (supply current) supplied from the supply units 2-1 and 2-2, respectively. The supply units 2-1 and 2-2 are provided on the back sides of the reflectors 4-1 and 4-2, respectively. The supply units 2-1 and 2-2 are connected to the control unit 10 and supplied with current from the control unit 10. The cooling fan 50 is connected to the control unit 10 and driven by constant current (hereinafter, referred to as "fan drive current") supplied form the control unit 10. Meanwhile, the LEDs 3-1 and 3-2, the supply units 2-1 and 2-2, the control unit 10, and the cooling fan 50 are provided in a housing that includes a front cover 5 and a body 6.

In the vehicle lamp 1, the cooling fan 50 prevents the temperature in the vehicle lamp 1 from locally rising as a result of heat generated by the LEDs 3-1 and 3-2 or the control unit 10 by directly blowing toward the LEDs 3-1 and 3-2 or the supply units 2-1 and 2-2, or circulating air in the vehicle lamp 1.

Figure 2:
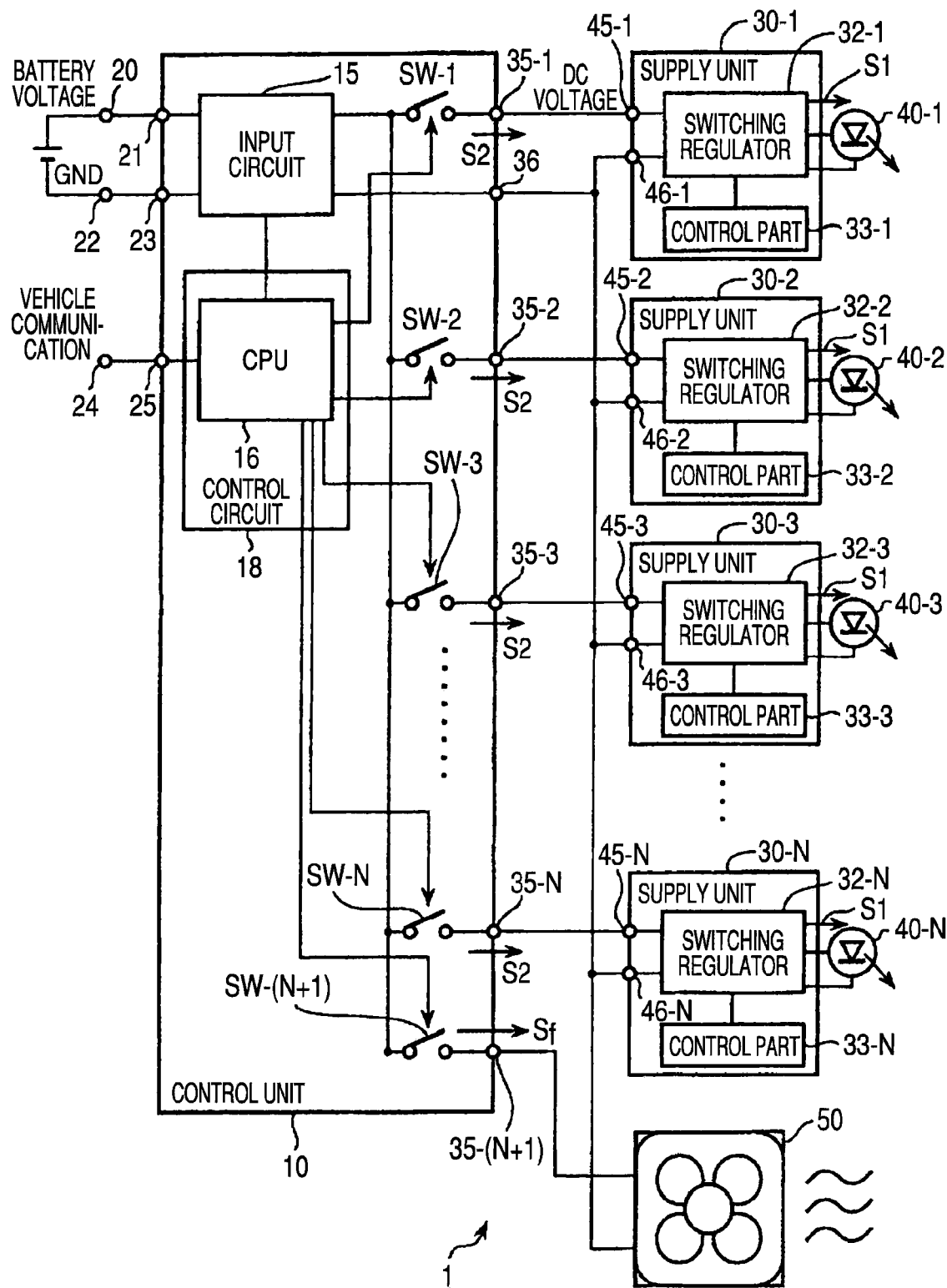
FIG. 2 is a block diagram of the vehicle lamp.

A vehicle lamp according to a first embodiment of the present invention will be described below. FIG. 2 is a block diagram showing the vehicle lamp according to the first embodiment of the present invention.

The vehicle lamp 1 includes a single control unit 10, N (N is an integer equal to 1 or more) supply units 30-1 to 30-N, light emitting diodes (LEDs) 40-1 to 40-N serving as a semiconductor light source, and a cooling fan 50. The control unit 10 and each of the supply units 30-1 to 30-N are mounted on a substrate (not shown).

The control unit 10 includes an input circuit 15; a control circuit 18 that includes a Central Processing Unit (CPU) 16, a Random Access Memory (RAM) (not shown), and a Read Only Memory (ROM) (not shown); and N+1 switch elements SW-1 to SW-(N+1). The input circuit 15 includes a noise filter and a surge protection element (e.g., surge absorber, power zener diode) such as a dump surge. Accordingly, it is possible to prevent an overvoltage surge from being applied to the cooling fan 50. It is advantageous that a semiconductor element such as a field effect transistor (FET) or an insulated gate bipolar transistor (IGBT) be used as each of the switch elements SW-1 to SW-(N+1).

The control unit 10 is provided with power source terminals 21 and 23, a signal input terminal 25, N+1 power source output terminals 35-1 to 35-(N+1), a power source output terminal 36 on a GND side. The power source terminal 21 is connected to a positive terminal of a DC power source (in-vehicle battery), which is mounted in a vehicle, through a power source input terminal 20. The power source terminal 23 is connected to a negative terminal (GND) of the DC power source through a power source input terminal 22 on the GND side. The signal input terminal 25 is connected to a communication signal input terminal 24, and communication signals are provided as input to the communication signal input terminal 24 from control devices (not shown) that control various functions of a vehicle. The N+1 power source output terminals 35-1 to 35-(N+1) are connected to the N+1 switch elements SW-1 to SW-(N+1), respectively.

The CPU 16 transmits control signals that are used to control ON/OFF of the N+1 switch elements SW-1 to SW-(N+1).

The supply units 30-1 to 30-N supply drive current S1, which is used as first current, to the LEDs 40-1 to 40-N, respectively. The control unit 10 supplies supply current S2, which is used as second current, to each of the supply units 30-1 to 30-N.

For convenience of description, it is assumed that the value of the drive current S1 is equal to that of the supply current S2. Accordingly, the supply current S2 detected by shunt resistors (described below) provided in the control unit 10 is substantially the same as the drive current S1 supplied to the LEDs by the supply units 30-1 to 30-N.

The supply units 30-1 to 30-N are connected to the LEDs 40-1 to 40-N that are formed of semiconductor light emitting elements, respectively. The LEDs 40-1 to 40-N serve as light sources of various vehicle lamps such as a headlamp, a stop & tail lamp, a fog lamp, and a turn signal lamp.

The supply units 30-1 to 30-N include switching regulators 32-1 to 32-N and control parts 33-1 to 33-N. Each of the switching regulators 32-1 to 32-N includes a transformer or a coil, a capacitor, a diode, and a negative channel metal oxide semiconductor (NMOS) transistor.

The supply units 30-1 to 30-N are provided with input terminals 45-1 to 45-N, respectively. The input terminals 45-1 to 45-N are connected to power source output terminals 35-1 to 35-N, respectively. The supply units 30-1 to 30-N are provided with input terminals 46-1 to 46-N, respectively. The input terminals 46-1 to 46-N are connected to the power source output terminal 36.

The supply units 30-1 to 30-N function as current supply units that supply the drive current S1 to the LEDs 40-1 to 40-N. The supply units 30-1 to 30-N in this embodiment include the switching regulators, but can include series regulators instead of the switching regulators 32-1 to 32-N.

Shunt resistors (not shown) are provided in the switching regulators 32-1 to 32-N, as circuit elements that detect current supplied to the LEDs 40-1 to 40-N and control the values of the current.

That is, each of the control parts 33-1 to 33-N controls the current supplied to the LEDs 40-1 to 40-N so that the voltages of both ends of the shunt resistors (not shown) become constant.

Each of the control parts 33-1 to 33-N controls the switching regulators 32-1 to 32-N in accordance with the characteristics or specification of the LEDs 40-1 to 40-N so that the drive current S1 flowing in each of the LEDs 40-1 to 40-N has a desired value.

The input terminal of the cooling fan 50 is connected to the power source output terminal 35-(N+1) and the power source output terminal 36.

In this case, if the LEDs 40-1 to 40-N and the cooling fan 50 are in a normal state, an ON/OFF signal (switching signal) from the CUP 16 is transmitted to all the N+1 switch elements SW-1 to SW-(N+1), so that all the N+1 switch elements SW-1 to SW-(N+1) are turned ON/OFF. When the supply current S2 is supplied to each of the supply units 30-1 to 30-N, the LEDs 40-1 to 40-N are driven and turned ON. Fan drive current Sf also flows in the cooling fan 50, so that the LEDs 40-1 to 40-N are turned ON and the cooling fan 50 is also rotationally driven.

In contrast, if the switch elements SW-1 to SW-N are turned ON and the supply of electric power from the DC power source is stopped, the supply of the supply current S2 to each of the supply units 30-1 to 30-N is stopped and the LEDs 40-1 to 40-N are turned OFF. The LEDs 40-1 to 40-N are turned OFF and the switch element SW-(N+1) is turned OFF, so that the rotational drive of the cooling fan 50 is stopped.

Figure 3:
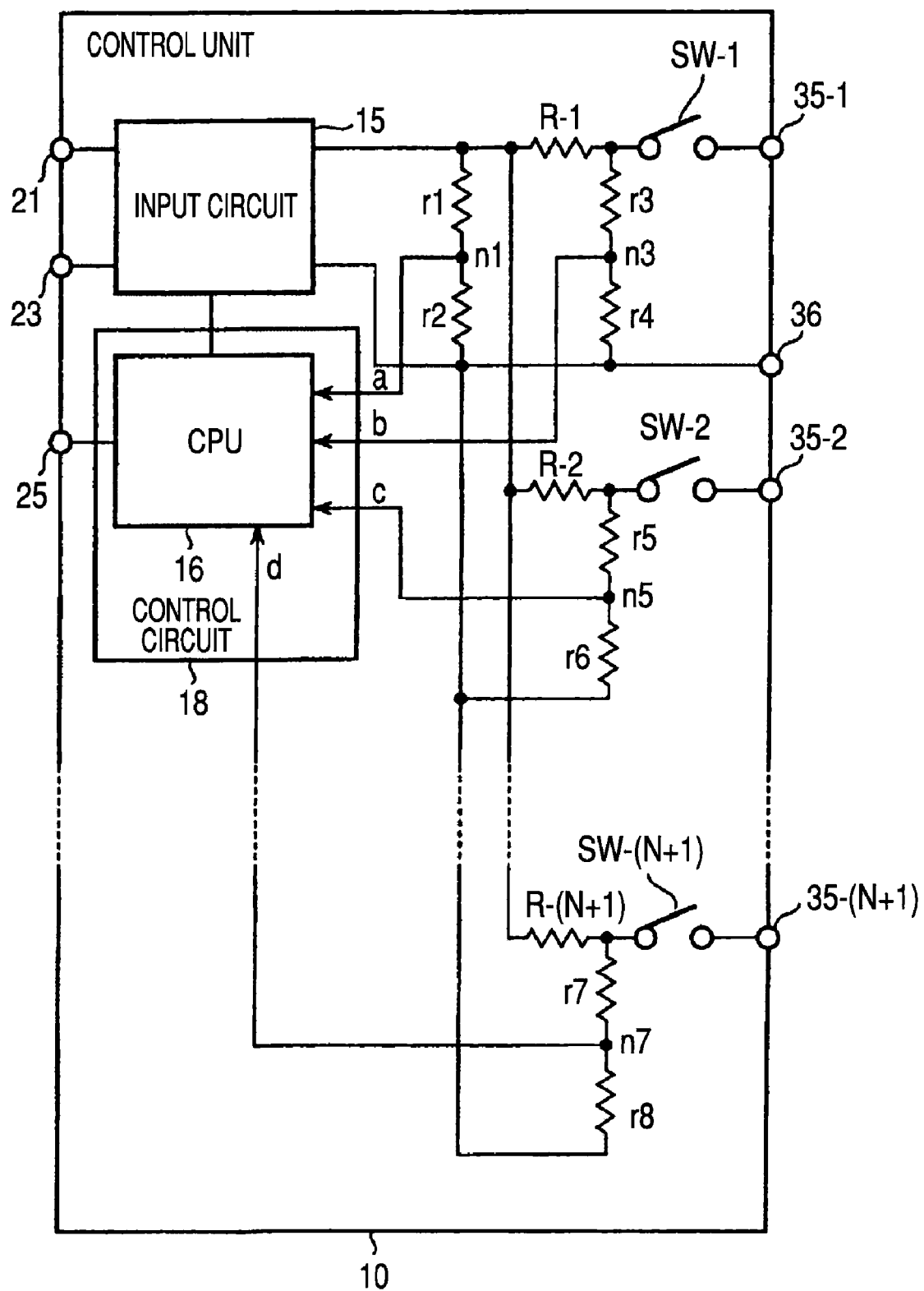
FIG. 3 is a circuit diagram of a control unit shown in FIG. 1.

Next, the configuration and operation of the control unit 10 according to a second embodiment of the present invention is described with reference to FIGS. 2 and 3, in which a shunt resistor R-(N+1) (see FIG. 3) in the control unit 10 is used as a current detection circuit.

Shunt resistors R-1 to R-(N+1) used as current detection means are provided at first ends of switch elements SW1 to SW-(N+1), respectively. One end of the shunt resistor R-1 is connected to the end of a respective one of the resistors R-2 to R-(N+1).

The shunt resistors R-1 to R-N detect the supply current S2 provided to the supply units 30-1 to 30-N, respectively. However, the shunt resistors detect the drive current S1 supplied to the LEDs 40-1 to 40-N through the supply units 30-1 to 30-N as a result of the above-mentioned operation.

The shunt resistor R-(N+1) functions as current detection means that detects the fan drive current Sf supplied to the cooling fan 50.

Respective ends of the shunt resistors R-1 to R-(N+1) and resistors r1 and r2 (which are connected to each other in series) are connected to each other in series. The other end of the shunt resistor R-1 and resistors r3 and r4 (which are connected to each other in series) are connected to each other in series. The other end of the shunt resistor R-2 and resistors r5 and r6 (which are connected to each other in series) are connected to each other in series. The other end of the shunt resistor R-(N+1) and resistors r7 and r8 (which are connected to each other in series) are connected to each other in series. Respective ends of the resistors r4, r6, and r8 are connected to one end of the resistor r2.

The current detected by the shunt resistors R-1 to R-N is detected as the drive current S1 for supplying voltages, which are generated at both ends of the shunt resistors R-1 to R-N, to the LEDs 40-1 to 40-N through the supply units 30-1 to 30-N.

The fan drive current Sf and the drive current S1, which is provided through the input circuit 15 after electric power is supplied from the DC power source, are calculated on the basis of potential difference (detection voltage "a") at a connection point (node n1) between the resistors r1 and r2. The detection voltage "a" is used as a reference voltage in comparison and determination described below.

The supply current S2, which is supplied to the supply unit 30-1 and detected by the shunt resistor R-1, is calculated on the basis of potential difference (detection voltage "b") at a connection point (node n3) between the resistors r3 and r4.

The supply current S2, which is supplied to the supply unit 30-2 and detected by the shunt resistor R-2, is calculated on the basis of potential difference (detection voltage "c") at a connection point (node n5) between the resistors r5 and r6.

The fan drive current Sf, which is supplied to the cooling fan 50 and detected by the shunt resistor R-(N+1), is calculated on the basis of potential difference (detection voltage "d") at a connection point (node n7) between the resistors r7 and r8. The values of the supply current S2 and the fan drive current Sf, which are detected in this way, are fed back to the CUP 16.

The CPU 16 compares the voltage "b", the voltage "c", and the voltage "d" with the detection voltage "a" used as the reference voltage (threshold value). Then, the CUP determines the states of the supply units 30-1 to 30-N and the cooling fan 50 in accordance with the results of the comparison.

For example, when all of the LEDs 40-1 to 40-N and the cooling fan 50 are normal, a constant output current (the supply current S2 and the fan drive current Sf) is provided from the control unit 10.

In this case, the average magnitude of the drive current S1 supplied to the LEDs 40-1 to 40-N is changed by adjusting the duty ratio of the switch elements SW-1 to SW-N. The average magnitude of the fan drive current Sf supplied to the cooling fan 50 is changed by adjusting the duty ratio of the switch element SW-(N+1).

Meanwhile, since drop voltages are not generated at both ends of the shunt resistor R-(N+1), for example, when the cooling fan 50 is opened as the result of a disconnection, the fan drive current is not detected. Accordingly, when the detection voltage "a" and the detection voltage "d" are compared with each other by the CPU 16, the detection voltage "d" is not dropped with respect to the detection voltage "a" and becomes a comparison result different from the normal state. Therefore, the CPU 16 determines that the cooling fan 50 is in an abnormal state, and transmits control signals to the switch elements SW-1 to SW-N so that the supply of the supply current S2 is stopped. After that, the supply of the drive current S1 to the LEDs 40-1 to 40-N is stopped, and the LEDs 40-1 to 40-N are turned OFF.

Further, since drop voltages are not generated at both ends of each of the shunt resistors R-1 to R-N, for example, when all the LEDs 40-1 to 40-N are opened as the result of a disconnection, the supply current S2 supplied to the LEDs 40-1 to 40-N is not detected. Accordingly, the CPU 16 determines that all the LEDs 40-1 to 40-N are in an abnormal state. In this case, the CPU 16 transmits a control signal to the switch element SW-(N+1) so that the supply of the fan drive current is stopped. After that, the supply of the current to the cooling fan 50 is stopped.

Meanwhile, the abnormal state is notified as a vehicle communication signal to other control devices in a vehicle through the communication signal input terminal 24. Other control devices are devices that control the various functions of a vehicle. For example, the states of the drive control of the LEDs and the cooling fan may be notified to a driver, or an alternative light source may be turned ON during the failure.

The abnormal state of the cooling fan 50 is determined by determining whether the magnitude of the fan drive current detected by the shunt resistor is equal to or smaller than the predetermined reference value (threshold value). The abnormal states of the LEDs 40-1 to 40-N are determined by determining whether the magnitude of the LED drive current detected by the shunt resistor is equal to or smaller than a predetermined reference value (threshold value). Accordingly, when opening abnormality such as disconnection occurs in the cooling fan 50, it is possible to stop the supply of current to the LEDs 40-1 to 40-N by providing a shunt resistor R-(N+1) used as a current detection circuit in the control unit 10, and to avoid a state where the LEDs 40-1 to 40-N are still turned ON and continue to generate heat after the occurrence of abnormality.

Further, even when the opening abnormality occurs in the LEDs 40-1 to 40-N due to disconnection, it is possible to avoid a state where only the cooling fan 50 continues to be rotationally driven.

Furthermore, according to the above-mentioned configuration, it is possible to use a circuit previously included in the control unit 10 as it is and to detect the abnormality of the cooling fan without causing an increase in cost.

In addition, since the abnormal state of the LED or the cooling fan is notified to a vehicle through the communication signal input terminal 24, it is possible to make a user aware of the abnormal state and to facilitate checking of the vehicle lamp.

Next, in a third embodiment of the present invention, the dimming control of the LEDs 40-1 to 40-N and the air volume control of the cooling fan 50 is described with reference to FIGS. 4A to 4C, which are views illustrating the dimming control of the LEDs and the air volume control of the cooling fan.

Figure 4A:
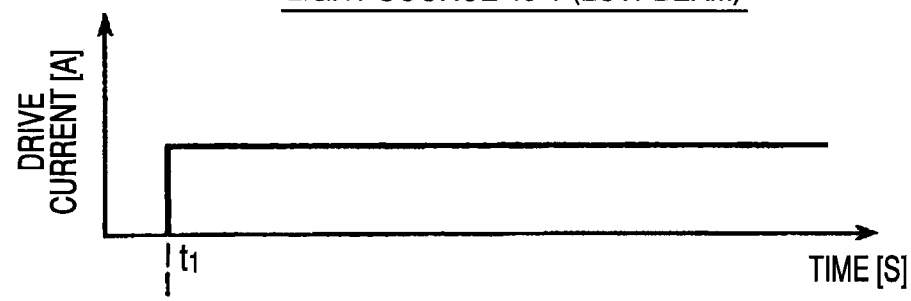
FIG. 4A is a graph showing a relationship between time and drive current supplied to a low beam.
Figure 4B:
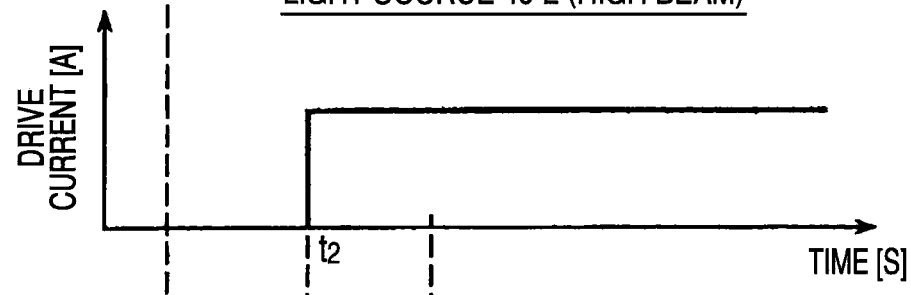
FIG. 4B is a graph showing a relationship between time and drive current supplied to a high beam.
Figure 4C:
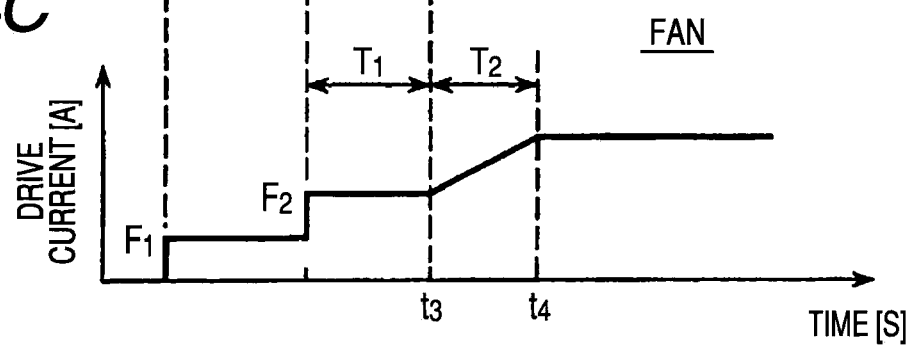
FIG. 4C is a graph showing a relationship between time and drive current supplied to a cooling fan.

FIG. 4A is a graph showing a relationship between time and drive current supplied to the light source 40-1 (low beam). FIG. 4B is a graph showing a relationship between time and drive current supplied to the light source 40-2 (high beam). FIG. 4C is a graph showing a relationship between time and drive current supplied to the cooling fan 50.

The control circuit 18 performs control to adjust the magnitude of the fan drive current in accordance with one or both of the magnitude of the current of the LEDs 40-1 to 40-N and supply time of the supply current supplied to the LEDs 40-1 to 40-N. For example, the current drive control illustrated in FIGS. 4A to 4C is performed so that the fan drive current is gradually increased after time T1 elapses (Time t3) after a high beam and a low beam are simultaneously turned ON (Time t2) and the magnitude of the fan drive current becomes constant after time T2 elapses (Time t4).

In this case, the dimming control of the LEDs 40-1 to 40-N is performed by adjusting the duty of ON/OFF of the switch elements SW-1 to SW-N. Further, the air volume control of the cooling fan 50 is performed by adjusting the duty of ON/OFF of the switch element SW-(N+1).

Accordingly, while suppressing the high temperature condition of the LEDs, it is possible to control light in desired dimming (light distribution) in accordance with vehicle traveling conditions.

The dimming control of the LEDs 40-1 to 40-N and the air volume control of the cooling fan 50 are generally performed on the basis of the temperature of the LEDs 40-1 to 40-N. In this case, new additional devices such as temperature sensors for detecting the temperature of the LEDs 40-1 to 40-N are required.

The turn-ON time of the LEDs 40-1 to 40-N and the turn-ON state of the high beam are detected, and the dimming control of the LEDs 40-1 to 40-N and the air volume control of the cooling fan 50 are performed in accordance with the results of the detection. The reason for this is as follows: if the turn-ON time of the LEDs 40-1 to 40-N is long, the temperature of the LEDs 40-1 to 40-N rises. Since temperature in an illuminator rises if a high beam is turned ON, the air volume of the cooling fan 50 needs to be increased.

For example, if the turn-ON time of the LEDs 40-1 to 40-N exceeds a predetermined time (threshold value), the control unit 10 performs control so as to increase the air volume of the cooling fan 50. Meanwhile, in this case, the turn-ON time of the LEDs 40-1 to 40-N, which is required until the temperature of the LEDs 40-1 to 40-N becomes a predetermined temperature, needs to be set as the threshold value. Here, the longest turn-ON time of the turn-ON time of the LEDs 40-1 to 40-N may be set as the threshold value, and the shortest turn-ON time of the LEDs may be set as the threshold value. The threshold value may be freely decided and is not limited to these specific examples.

For example, if a high beam is turned ON, the control unit 10 performs control so as to increase the air volume of the cooling fan 50.

For example, if a high beam is turned ON and the turn-ON time exceeds a predetermined time (threshold value) in this state, the control unit 10 performs control so as to increase the air volume of the cooling fan 50. Meanwhile, in this case, the turn-ON time of the LEDs, which is required until the temperature of the LEDs becomes a predetermined temperature in the turn-ON state of the high beam, needs to be set as the threshold value.

The turn-ON time of the LEDs can be monitored by the CPU 16 of the control unit 10. The turn-ON of others than that of the LEDs can be achieved by communication. Accordingly, if only computer program is modified even in this case, hardware (circuit) can be used as it is and electric power saving can be achieved without causing cost increase. Meanwhile, it is possible to adjust the air volume of the cooling fan 50 by adjusting the duty ratio of ON/OFF of the switch element in the control unit 10.

According to the above-mentioned control, it is possible to individually control the current (supply current S2) supplied to the supply units 30-1 to 30-N and the current (fan drive current Sf) supplied to the cooling fan 50 so that desired values can be obtained. Therefore, it is possible to radiate an appropriate amount of light in accordance with traveling conditions, for example, daytime, evening, night, and a tunnel, and to suppress the unnecessary supply of current (electric power) to the cooling fan 50. Further, since current supply unit dedicated only to the cooling fan 50 does not need to be used, it is possible to suppress the cost increase that is caused by the increase of the number of parts.

Next, a vehicle lamp according to a fourth embodiment of the present invention is described. The vehicle lamp according to the first embodiment includes a single cooling fan, but a vehicle lamp according to the fourth embodiment includes a plurality of cooling fans. Meanwhile, the other configuration of the vehicle lamp according to the fourth embodiment is the same as that of the vehicle lamp according to the first embodiment except that the vehicle lamp according to the fourth embodiment includes multiple cooling fans. Therefore, the description of the other configuration thereof will be omitted. Further, M (M is an integer equal to 1 or more) cooling fans are provided, and is described with reference to FIGS. 1 and 2.

The vehicle lamp according to the fourth embodiment includes a single control unit 10, N supply units 30-1 to 30-N, LEDs 40-1 to 40-N, M cooling fans (hereinafter, referred to as cooling fans 50-1 to 50-M). Meanwhile, since the number of the LEDs 40-1 to 40-N is N and the number of the cooling fans 50-1 to 50-M is M as described above, the description will be given with SW1 to SW-(N+M) used as reference numbers of switch elements, and R-1 to R-(N+M) used as reference numbers of shunt resistors.

The control unit 10 includes switch elements SW1 to SW-(N+M). Shunt resistors R-1 to R-(N+M), which are used as current detection means, are provided on first ends of the switch elements SW1 to SW-(N+M), respectively. The shunt resistors R-(N+1) to R-(N+M) function as current detection means that detect current supplied to the cooling fans 50-1 to 50-M, respectively.

The values of the fan drive current, which are detected by the shunt resistors R-(N+1) to R-(N+M), are fed back to the CUP 16.

Since drop voltages are not generated at both ends of the shunt resistors R-(N+1) to R-(N+M) when all the cooling fans 50-1 to 50-M are opened, for example, as the result of a disconnection, the fan drive current Sf is not detected. The CPU 16 determines that the cooling fans 50-1 to 50-M are in an abnormal state, and transmits control signals to the switch elements SW-1 to SW1-N so that the supply of the supply current S2 is stopped. After that, the supply of the drive current S1 to the LEDs 40-1 to 40-N is stopped, and the LEDs 40-1 to 40-N are turned OFF.

For example, if only any one of the cooling fans is opened as the result of a disconnection when two cooling fans 50-1 and 50-2 are provided, all the LEDs 40-1 to 40-N may be controlled to be turned OFF or only a specific LED may be controlled to be turned OFF.

According to exemplary embodiments of the present invention, since the control unit may include N+M current detection circuits corresponding to multiple switch elements, respectively, it is possible to detect the abnormality of the cooling fan without increasing the size of the circuit. In addition, the control unit determines whether the values of the fan drive current detected by the current detection circuits are equal to or smaller than the threshold value. If determining that the values of the fan drive current are equal to or smaller than the threshold value, the control unit controls the amount of the supplied second current such that the amount of the supplied second current is decreased and generates abnormal signals of the fans. Therefore, for example, even though the current supply wiring to the cooling fan is opened and the cooling fan is not operated, it is possible to control the supply of current to the semiconductor light sources at low cost in accordance with the different open abnormal states.

According to exemplary embodiments of the present invention, if determining that the magnitude of the detected LED drive current is equal to or smaller than the threshold value, the control unit controls the amount of the supplied fan drive current such that the amount of the supplied fan drive current is decreased. Therefore, it is possible to stop the supply of current to the cooling fan without causing cost increase, and to prevent the failure of the cooling fan that is caused by temperature rise.

According to exemplary embodiments of the present invention, the control unit performs control to adjust the magnitude of the fan drive current in accordance with one or both of the magnitude of the current of all the semiconductor light sources and supply time of the semiconductor light source current. Accordingly, while suppressing the temperature rise of the light source, it is possible to control light in desired dimming (light distribution) in accordance with vehicle traveling conditions.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A vehicle lamp comprising:
N semiconductor light sources, wherein N is an integer of 1 or more;
M fans configured to cool the N semiconductor light sources, wherein M is an integer of 1 or more;
N current supply units configured to supply first current to the N semiconductor light sources, respectively; and
a control unit configured to receive electric power from an electric power source and to supply second current to the N current supply units, the control unit comprising:
N switch elements that correspond to the N semiconductor light sources;
M switch elements that correspond to the M fans, wherein the M switch elements are different from the N switch elements;
a control circuit configured to control fan drive current supplied to the fans through the switch elements and the second current; and
N+M current detection circuits that correspond to the N switch elements and the M switch elements to detect the fan drive current and the second current, and
wherein the fans are coupled to the control unit and wherein each of the M switch elements stops a rotational drive of the corresponding fan by shutting off the fan drive current when the switch element is turned off, and
wherein the control unit is arranged so that if the control unit determines that values of the fan drive current detected by the current detection circuits are equal to or smaller than a threshold value, the control unit controls the amount of the supplied second current such that the amount of the supplied second current is decreased and generates abnormal signals of the fans.

2. A vehicle lamp comprising:
N semiconductor light sources, wherein N is an integer of 1 or more
M fans configured to cool the N semiconductor light sources, wherein M is an integer of 1 or more;
N current supply units configured to supply first current to the N semiconductor light sources, respectively; and
a control unit configured to receive electric power from an electric power source and to supply second current to the N current supply units, the control unit comprising:
N switch elements that correspond to the N semiconductor light sources;
M switch elements that correspond to the M fans, wherein the M switch elements are different from the N switch elements;
a control circuit configured to control fan drive current supplied to the fans through the switch elements and the second current; and
N+M current detection circuits that correspond to the N switch elements and the M switch elements to detect the fan drive current and the second current, and
wherein the fans are coupled to the control unit and wherein each of the M switch elements stops a rotational drive of the corresponding fan by shutting off the fan drive current when the switch element is turned off, and
wherein the control unit is arranged so that if the control unit determines that values of the second current detected by the current detection circuits are equal to or smaller than a threshold value, the control unit controls the amount of the supplied fan drive current such that the amount of the supplied fan drive current is decreased and generates abnormal signals of the semiconductor light sources.

3. The vehicle lamp according to claim 2, wherein the control unit is arranged to control the magnitude of the fan drive current in accordance with supply time of the second current.

4. A vehicle lamp comprising:
N semiconductor light sources, wherein N is an integer of 1 or more;
M fans configured to cool the N semiconductor light sources, wherein M is an integer of 1 or more;
N current supply units configured to supply first current to the N semiconductor light sources, respectively; and
a control unit configured to receive electric power from an electric power source and to supply second current to the N current supply units, the control unit comprising:
N switch elements that correspond to the N semiconductor light sources;
M switch elements that correspond to the M fans;

a control circuit configured to control fan drive current supplied to the fans through the switch elements and the second current, and N+M current detection circuits that correspond to the N switch elements and the M switch elements to detect the fan drive current and the second current, wherein the fans are coupled to the control unit, and wherein the control unit is arranged so that if the control unit determines that values of the fan drive current detected by the current detection circuits are equal to or smaller than a threshold value, the control unit controls the amount of the supplied second current such that the amount of the supplied second current is decreased and generates abnormal signals of the fans.

5. A vehicle lamp comprising:

N semiconductor light sources, wherein N is an integer of 1 or more;

M fans configured to cool the N semiconductor light sources, wherein M is an integer of 1 or more;

N current supply units configured to supply first current to the N semiconductor light sources, respectively; and a control unit configured to receive electric power from an electric power source and to supply second current to the N current supply units, the control unit comprising:

N switch elements that correspond to the N semiconductor light sources;

M switch elements that correspond to the M fans;

a control circuit configured to control fan drive current supplied to the fans through the switch elements and the second current, and N+M current detection circuits that correspond to the N switch elements and the M switch elements to detect the fan drive current and the second current, wherein the fans are coupled to the control unit, and wherein the control unit is arranged so that if the control unit determines that values of the second current detected by the current detection circuits are equal to or smaller than a threshold value, the control unit controls the amount of the supplied fan drive current such that the amount of the supplied fan drive current is decreased and generates abnormal signals of the semiconductor light sources.

6. The vehicle lamp according to claim 5, wherein the control unit is arranged to control the magnitude of the fan drive current in accordance with supply time of the second current.

* * * * *